United States Patent Office 3,337,554
Patented Aug. 22, 1967

3,337,554
PIPERAZINO AND HOMOPIPERAZINO-10-11-DIHYDROBENZO[b,f]-THIEPIN
Jiří Jílek, Miroslav Protiva, and Josef Pomykáček, Prague, Czechoslovakia, assignors to Spofa, Spojene zavody pro zdravotnickou vyrobu, Prague, Czechoslovakia
No Drawing. Filed Sept. 14, 1965, Ser. No. 487,319
Claims priority, application Czechoslovakia, Sept. 17, 1964, 5,172/64
7 Claims. (Cl. 260—268)

The invention relates to new amines and to a method of their preparation, which amines are of the general formula:

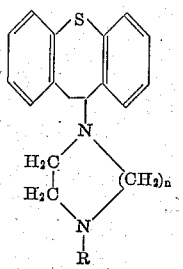

I wherein R is selected from the group consisting of hydrogen, alkyl with 1-4 carbon atoms and hydroxy alkyl with 1-4 carbon atoms, and $n$ is 2 or 3.

Said substances are intermediate products in the preparation of pharmacodynamically effective substances (in the psychotropical, neurotropical, and hypotensive point), which besides show for themselves certain types of neurotropic activity, e.g. antihistaminic, local anesthetic, analgetic, spasmolytic, and in the form of quaternary salts also a ganglioplegic and anticholinergic activity.

The method of preparing new amines in the support of the present invention resides in the reaction of 10-chloro-10,11-dihydrodibenzo(b,f)thiepin with substances of the general Formula II:

$$R^1R^2NH \qquad II$$

wherein the general symbols have the same definition as in the formula I, i.e. with ammonia and primary or secondary amines. The reaction can be effected at various conditions, so e.g. in excess amine serving as the reaction medium and condensation agent at the same time, further in some solvents (e.g. alcohols, toluene, acetone) using excess amine, or at least using an equivalent of the amine, still with aid of inorganic or organic condensation agents (anhydrous potash, pyridine, triethylamine). The particulars of carrying out the reaction may follow from the examples. The products thus obtained are of basic character, giving by action of acids crystalline salts, whereof the hydrochlorides of maleates are especially suitable for pharmaceutical purpose.

EXAMPLES

Example I 2.0 g. 10-chloro - 10,11 - dihydrodibenzo(b,f)thiepin is dissolved in 3.0 ml. N-methylpiperazine, and the solution is heated for 2 hours to 100–110°. After cooling down it is diluted with water and extracted with benzene. The extract is thoroughly washed with water and then shaken with 30 ml. 3 N HCl. The crystalline dihydrochloride of 10-(4-methylpiperazino)-10,11 - dihydrobenzo(b,f)thiepin is eliminated in a yield of 2.2 g. It is sucked off and recrystallized from water; M.P. 208–212°.

Example II

A mixture of 20.8 g. 1-(hydroxyethyl)piperazine (B.P. 120° (15 mm. Hg) and 12.0 g. 10-chloro10,11-dihydrodibenzo(b,f,)thiepin is heated for 4 hours to 110°. After cooling down it is mixed with 100 ml. water, and the solid product eliminated is sucked off. After being dried in air it is recrystallized from 60 ml. boiling benzene. By sucking off the crystalline product and processing the mother liquors there is obtained altogether 9.65 g. of the desired pure substance, i.e. 10-4-(2-hydroxyethyl)-piperazine-10, 11-dihydrobenzo(b,f)thiepin with M.P. 108–110° (aq. ethanol). By neutralization of the base with maleic acid in alcoholic solution the crystalline maleate with M.P. 129–130° is obtained on addition of a little of ether.

The starting 10-chloro-10,11-dihydrodibenzo(b,g)thiepin has been prepared from the known diphenylsulfide-o-carboxylic acid by the following procedure:

46 g. of diphenylsulfide-o-carboxylic acid is boiled for 4.5 hours with a solution of 7.6 g. lithium-aluminum hydride in 900 ml. ether. After cooling down the mixture is decomposed by dropwise addition of 40 ml. water-saturated ether, thereupon 100 ml. water, and at least 240 ml. dilute hydrochloric acid (1:3) are added. The ethereous phase is washed with a 10% soda solution, and processed by distillation. There is obtained 32.5 g. o-hydroxydiphenylsulfide with B.P. 155°/0.5 mm. Hg.

To a solution of 30.0 g. of the said o-hydroxymethyl-diphenylsulfide in 11 g. absol. pyridine 16.5 g. thionyl chloride is dropwise added with stirring and cooling with ice. The mixture is further stirred for 2 hours at room temperature, whereupon it separates between ether and water. The ethereous layer is washed with 10% soda solution and water, dried with anhyd. sodium sulfate and processed by distillation. There is obtained 28.5 g. (88%) of o-chloromethyldiphenylsulfide with B.P. 138–140°/0.4 mm. Hg.

To a solution of 8.0 g. sodium cyanide, in 15 ml. water 27.5 g. o-chloromethyldiphenylsulfide in 30 ml. ethanol is added and the mixture refluxed with stirring for 8 hours. After evaporation of ethanol the residue is diluted with 60 ml. water and extracted with benzene. The extract is washed with water, dried, and distilled over. There is obtained 24.0 g. (93%) of o-cyanomethyldiphenylsulfide with B.P. 156°/0.3 mm. Hg.

To a solution of 23.2 g. of the aforesaid nitrile in 75 ml. 95% ethanol a solution of 15 g. potassium hydroxide in 30 ml. water is added, and the mixture refluxed for 3 hours. Ethanol is then slowly distilled off at normal pressure, after cooling the residue diluted with 40 ml. water, and the solution obtained is washed with ether. After separation of the ether the aqueous solution is shortly heated to 100°, cooled down, and acidified with 60 ml. 3 N HCl. The oil eliminated rapidly becomes crystalline during standing. By filtering by suction there is obtained 23.0 g. (92%) of diphenylsulfide-o-acetic acid with M.P. 123° (benzene).

A mixture of 5.0 g. diphenylsulfide-o-acetic acid and 20 g. polyphosphoric acid is stirred for 1 hour at 125°. After cooling it is diluted with 60 ml. water and extracted with benzene. The extract is washed with 5% sodium hydroxide aqueous solution, dried with anhydr. potassium carbonate, and evaporated. By crystallization the residue yields 4.4 g. (95%) of 10,11-dihydrodibenzo(b,f)thiepin-10-on with M.P. 72–73° (ethanol).

To a boiling suspension of 5.0 g. of the said ketone in 8 ml. methanol a solution of 2.0 g. sodium borohydride in 15 ml. water (alkalized with a grain of sodium hydroxide) is added during 25 min. with stirring. The mixture is refluxed for 2 hours, left overnight at room temperature, thereupon partly evaporated, and the residue diluted with water. The oil thus eliminated rapidly crystallizes and is sucked off. There is obtained 4.9 g. (97%) of 10,11-dihydrobenzo(b,f)thiepin-10-ol with M.P. 100° (aqueous ethanol).

A mixture of 5.0 g. of the aforesaid alcohol and 10 ml. thienyl chloride is left overnight at room temperature and thereupon refluxed for 1 hour. The excess thienyl chloride is evaporated in vacuo, and the crystalline residue (5.5 g.) is recrystallized from cyclohexane. There is obtained the desired 10-chloro-10,11-dihydrodibenzo(b,f)thiepin, having M.P. 84.5°.

*Example III*

A mixture of 5.0 g. 10-chloro-10,11-dihydroxydibenzo(b,f)thiepin and 9.0 g. 1-methylhexahydro-1,4-diazepin is heated for 3.5 hours to 105°. After cooling down it is divided between 50 ml. water and 50 ml. benzene, the benzene layer is separated, and therefrom the product extracted into 30 ml. 3 N HCl. The acid solution separated is alkalized with 20% sodium hydroxide solution, and the base extracted with benzene. The benzene solution is filtered and evaporated. The residue crystallizes by standing. There is obtained 4.5 g. of the desired product with M.P. 82° (petroleum ether), i.e., 10-(4-methylhexahydro-1,4-diazepine)-10,11-dihydrodibenzo(b,f)thiepin. By neutralization of the base with maleic acid in ethanol and addition to the solution, the crystalline maleate with M.P. 142° (ethanol) is obtained.

*Example IV*

A mixture of 5.0 g. 10-chloro-10,11-dihydrodibenzo(b,f)thiepin and 10.0 g. anhydrous piperazine is heated for 3 hours to 110°. After cooling down it is operated analogically to the preceding example, and the desired base, i.e., 10-piperazino-10,11-dihydrodibenzo(b,f)thiepin with M.P. 103–105° (acetone) is obtained. By neutralizing with maleic acid similarly to the preceding example, the maleate with M.P. 188–190° (ethanol) is obtained.

*Example V*

Similarly to the preceding examples, a mixture of 5.0 g. 10-chloro-10,11-dihydrobenzo(b,f)thiepin and 10.0 g. 1-ethylpiperazine is processed. The desired base, i.e., 10 - (4 - ethylpiperazine) - 10,11 - dihydrodibenzo(b,f)thiepin in the form of a crystalline substance is obtained, having M.P. 85–86° (petroleum ether). It yields by neutralization with maleic acid the maleate with M.P. 150–151° (ethanol-ether).

We claim:
1. A substance selected from the group consisting of compounds of the formula:

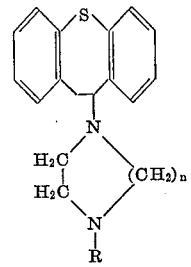

wherein R is selected from the group consisting of hydrogen, alkyl having 1–4 carbon atoms and hydroxy-alkyl having 1–4 carbon atoms, and $n$ is 2 or 3, and compounds of said formula with physiologically tolerated acids.

2. A substance as defined in claim 1, wherein R is $CH_3$ and $n$ is 2.
3. A substance as defined in claim 1, wherein R is $CH_2CH_2OH$ and $n$ is 2.
4. A substance as defined in claim 1, wherein R is $CH_3$ and $n$ is 3.
5. A substance as defined in claim 1, wherein R is hydrogen and $n$ is 2.
6. A substance as defined in claim 1, wherein R is $C_2H_5$ and $n$ is 2.
7. A substance as defined in claim 1, wherein said physiologically tolerated acid is selected from the group consisting of hydrochloric and maleic acid.

References Cited

UNITED STATES PATENTS

| | | | |
|---|---|---|---|
| 3,100,207 | 8/1963 | Zirkle | 260—268 |
| 3,262,934 | 7/1966 | Cusic et al. | 260—268 |

OTHER REFERENCES

Kawai: Chemical Abstracts, vol. 55 (1961), p. 21, 374g.

Kimota et al.: J. Pharm. Soc., Japan, vol. 77 (1957), pp. 652–55.

ALEX MAZEL, *Primary Examiner.*

HENRY R. JILES, *Examiner.*